(12) United States Patent
Kusano et al.

(10) Patent No.: US 8,549,292 B2
(45) Date of Patent: Oct. 1, 2013

(54) AUTHENTICATION AGENT APPARATUS, AUTHENTICATION AGENT METHOD, AND AUTHENTICATION AGENT PROGRAM STORAGE MEDIUM

(75) Inventors: Nobumi Kusano, Kanagawa (JP); Hitoshi Tsushima, Kanagawa (JP); Takashi Sakayama, Kanagawa (JP); Hiromoto Ando, Kanagawa (JP); Yoshimi Uezu, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 988 days.

(21) Appl. No.: 11/768,420

(22) Filed: Jun. 26, 2007

(65) Prior Publication Data

US 2008/0104675 A1 May 1, 2008

(30) Foreign Application Priority Data

Nov. 1, 2006 (JP) ................. 2006-298091

(51) Int. Cl.
H04L 29/06 (2006.01)
(52) U.S. Cl.
USPC ............... 713/168; 713/156; 726/10; 726/12; 709/202; 709/203
(58) Field of Classification Search
USPC ...................... 726/10, 12; 713/168
See application file for complete search history.

(56) References Cited

U.S. PATENT DOCUMENTS

| 2002/0049569 | A1* | 4/2002 | Lenoir et al. ............ 702/189 |
| 2003/0035124 | A1* | 2/2003 | Tomita et al. ............ 358/1.8 |
| 2003/0212806 | A1 | 11/2003 | Mowers et al. |
| 2003/0221112 | A1* | 11/2003 | Ellis et al. ............ 713/189 |
| 2004/0003287 | A1* | 1/2004 | Zissimopoulos et al. ...... 713/201 |
| 2005/0015585 | A1* | 1/2005 | Kurose ............ 713/155 |
| 2005/0055552 | A1 | 3/2005 | Shigeeda |
| 2005/0213591 | A1* | 9/2005 | Nakazawa et al. ............ 370/401 |
| 2005/0273849 | A1* | 12/2005 | Araujo et al. ............ 726/12 |
| 2006/0095541 | A1* | 5/2006 | Sojian et al. ............ 709/217 |

FOREIGN PATENT DOCUMENTS

| JP | 10341223 A | 12/1998 |
| JP | 2001197055 A | 7/2001 |
| JP | 2002202945 | 7/2002 |
| JP | 2004005647 A | 1/2004 |
| JP | 2005085102 A | 3/2005 |

OTHER PUBLICATIONS

Fox et al., "Security on the Move: Indirect Authentication Using Kerberos", MOBICOM, 1996, pp. 155-164.*

(Continued)

Primary Examiner — Thanhnga B Truong
Assistant Examiner — Thaddeus Plecha
(74) Attorney, Agent, or Firm — Gesmer Updegrove LLP (57) ABSTRACT

An authentication agent apparatus includes a communication request reception unit that receives a communication request to a client B of an authentication server from a client A of the authentication server, a data reception unit that receives data to be transmitted to the client B from the client A, an authentication request unit that issues to the authentication server an authentication request on the client A, a communication enabling request unit that requests the authentication server to enable communication between the client A and the client B, an enabling data acquisition unit that acquires enabling data to enable the communication with the client B from the authentication server, and a generation unit that generates transmission data to be transmitted to the client B on the basis of the enabling data and the data to be transmitted.

24 Claims, 8 Drawing Sheets

(56) References Cited

OTHER PUBLICATIONS

Harbitter et al., "The Performance of Public Key-Enabled Kerberos Authentication in Mobile Computing Applications", Nov. 2001, pp. 78-85.*

Japanese Notice of Grounds for Rejection mailed on Jan. 10, 2012 in connection with JP Patent Application No. 2006-298091 and English translation thereof.

* cited by examiner

AUTHENTICATION AGENT APPARATUS, AUTHENTICATION AGENT METHOD, AND AUTHENTICATION AGENT PROGRAM STORAGE MEDIUM

CROSS-REFERENCE TO RELATED APPLICATIONS

This application is based on and claims priority under 35 USC 119 from Japanese Patent Application No. 2006-298091, filed on Nov. 1, 2006.

BACKGROUND

1. Technical Field

The present invention relates to an authentication agent apparatus, an authentication agent method, and an authentication agent program storage medium.

2. Related Art

In recent years, a system in which a directory server or the like is used and authentication or access control is performed through a network has come into widespread use. Here, a typical authentication mode of Kerberos known as one of such authentication techniques will be described.

Kerberos is a system in which logical configuration elements of a key distribution center KDC (Key Distribution Center), an authentication server AS (Authentication Server), and a ticket granting server TGS (Ticket Granting Server) are used to perform the authentication processing of a client and the communication permission processing (communication enabling processing) between a client and another client. The three logical configuration elements are generally integrated into one and are mounted, and hereinafter, these are collectively called simply an authentication server.

The authentication server has a key (called K0) owned by only the authentication server, and shares with a client a common key (called K1), which is generated from the seed of the password of the client. In addition, the authentication server shares with the other client (here, called an application server) a common key (called K2), which is generated from, as the seed of the key, the password of the application server.

When desiring to access (communicate with) the application server, first, the client issues an authentication request to the authentication server. When the authentication becomes successful, the authentication server generates a session key (called K3) and a TGT (Ticket Granting Ticket; also called an initial ticket). The TGT is data generated by encrypting the information, such as an IP (Internet Protocol) address of the client, K3, and an expiration date, with K0. The authentication server encrypts K3 and the TGT with K1 and transmits them to the client. The client performs decryption with k1 and extracts the TGT and K3.

Next, the client transmits an access permission request (access enabling request) to access the application server, a time stamp encrypted with K3, and the TGT to the authentication server. The authentication server decrypts the TGT with K0, and extracts the information such as the IP address of the client, K3, and the expiration date. After confirming that the expiration date does not expire, the authentication server decrypts the time stamp with K3 to verify that the requester is the client having a proper right, and grasps that the access permission to the application server is requested.

In the case where the access request from the client is permitted, the authentication server generates a session key (called K4) for communication between the client and the application server. Then, what (called a service ticket) is obtained by encrypting K4 with K2 and what is obtained by encrypting K4 with K3 are generated and are transmitted to the client.

The client decrypts the latter with K3, and extracts K4. The client uses the extracted K4 to encrypt the access request to the application server, and delivers this, together with the service ticket (K4 remaining encrypted with K2), to the application server. Since the application server can decrypt the service ticket with K2 and can extract K4, it is possible to verify that the client is permitted to communicate by the authentication server. The request from the client is decrypted with the extracted K4. In this way, safe communication using K4 is performed between the client and the application server.

As stated above, in the authentication system of Kerberos, when the client authentication is performed by the authentication server, the authentication server issues the TGT to the client. The TGT is the data issued by the authentication server to the authenticated client, and can be said to be authorization data to authorize the client to request the authentication server to permit (enable) access (communication) to another client. When the client uses the TGT to request the authentication server to permit the access to another client, the authentication server issues to the client the service ticket for accessing the other client. The service ticket is data issued by the authentication server to the client having requested the access, and can be said to be the enabling data to enable this client to access the other client as the access destination.

Incidentally, the authentication server may include multiple server elements that are mutually authenticated. In the case where the multiple server elements are mutually authenticated (in the case where a common key is owned), the reliable relation is linked so that clients of the different server elements can communicate with each other. This is a technique called cross-realm authentication (authentication is mutually performed across a realm (range on a network) relied on by an authentication server) and a realm relied on by another authentication server).

Various apparatuses can participate in the authentication system of Kerberos without limitation, so long as the apparatuses can process the TGT, the service ticket, and the like.

SUMMARY

According to an aspect of the invention, there is provided an authentication agent apparatus including a communication request reception unit that receives a communication request to a client B of the authentication server from a client A of an authentication server, a data reception unit that receives data to be transmitted to the client B from the client A, an authentication request unit that issues to the authentication server an authentication request on the client A, a communication enabling request unit that requests the authentication server to enable communication between the client A and the client B, an enabling data acquisition unit that acquires enabling data to enable the communication with the client B from the authentication server, and a generation unit that generates transmission data to be transmitted to the client B on the basis of the enabling data and the data to be transmitted.

BRIEF DESCRIPTION OF THE DRAWINGS

Exemplary embodiment(s) of the present invention will be described by reference to the following figures, wherein.

DETAILED DESCRIPTION

Hereinafter, exemplary embodiments will be described.

In this exemplary embodiment, a description will be made while showing an authentication server, an authentication agent as an authentication agent apparatus, and an image-processing apparatus or a document server as a client of the authentication server. The image-processing apparatus and the document server correspond to the client A and the client B. In this exemplary embodiment, the description will be made on the premise of the authentication technique of Kerberos. Incidentally, the server is an apparatus to provide a service in response to the request of a client, and the client is an apparatus to enjoy the service provided by the server.

Figure 1:
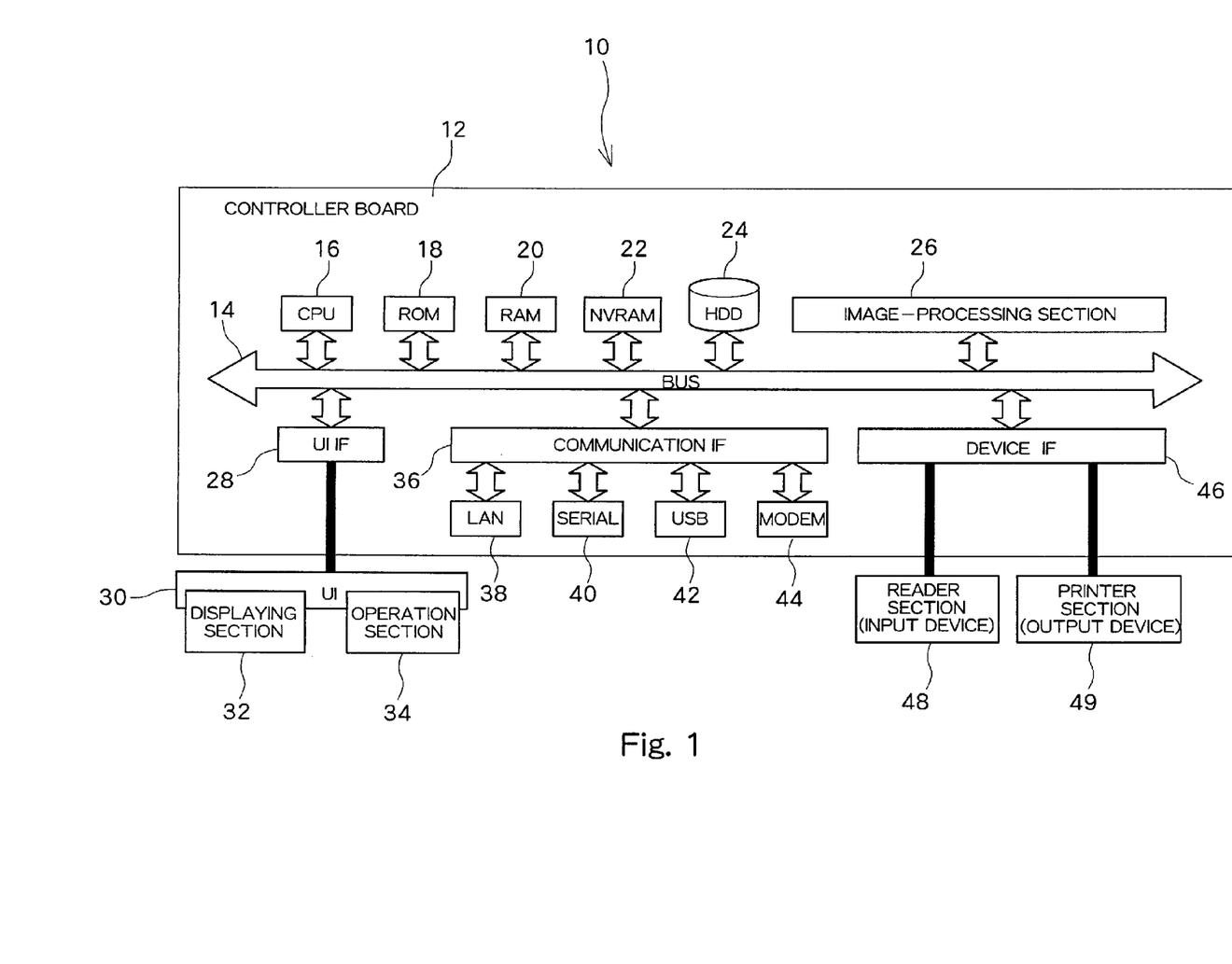
FIG. 1 is a view showing a hardware structure example of an image-processing apparatus according to an exemplary embodiment.

First, a hardware structure of a computer will be described by reference to FIG. 1. FIG. 1 is a view showing the hardware structure of an image-processing apparatus 10 according to this exemplary embodiment. The image-processing apparatus 10 includes a controller board 12. A bus 14 serving as an inner communication path is provided on the controller board 12, and the bus 14 is connected with a CPU (Central Processing Unit) 16, ROM (Read Only Memory) 18, RAM (Random Access Memory) 20, NVRAM (NonValatile RAM) 22, an HDD (Hard Disc Drive) 24, an image-processing section 26, a UI_IF (User Interface_Interface) 28, a communication IF 36, and a Device IF 46.

The CPU 16 is a processing section that performs the main control of the image-processing apparatus, and operates in accordance with a program. The CPU 16 has various processing functions corresponding to the program structure. The ROM 18 is a non-rewritable nonvolatile memory, and stores the program and fixed data. However, the ROM 18 may be made to have a rewritable structure using a flash memory. The RAM 20 is a rewritable volatile memory, and is used as a system memory for program operation and a page memory for image processing. The NVRAM 22 is a rewritable nonvolatile memory, and stores nonvolatile data, picture quality adjustment, various setting parameters, and various histories. The HDD 24 is a large-capacity storage device constructed of a magnetic disk or the like, and stores image data and various histories. The image-processing section 26 includes an image-processing-dedicated circuit such as a coprocessor, and performs compression/expansion processing of image data, and image processing of various types.

The UI_IF 28 is an interface to a UI 30. The UI_IF 28 is connected with the UI 30 provided outside the controller board 12, and the UI 30 includes a displaying section 32 such as a display or a light-emitting diode, and an operation section 34 such as a hard key or a touch panel.

The communication IF 36 is an interface to various external apparatuses and a network. The communication IF 36 is connected with various interfaces of a LAN (Local Area Network) 38, a Serial Port 40, a USB (Universal Serial Bus) Port 42, and a modem 44. The LAN 38 is connected to the network in wired form using 10/100 BASE-T or the like or in wireless form. The Serial Port 40 is used for direct connection to various external peripheral apparatuses, and the USB 42 is used for direct connection to an apparatus to support USB 1.1 or USB 2.0. In addition, the modem 44 performs connection of a FAX or the like to a public network.

The Device IF 46 is connected with a reader section 48, such as a scanner, a platen, or an automatic document reader (including both-sided reading), provided outside the controller board 12, and a printer section 49 including a print engine and the like. The reader section 48 performs image processing to read a sheet and to newly generate image data, and the printer section 49 performs image processing to print an image on a sheet on the basis of the image data.

Incidentally, a program to control the CPU 16 is typically stored in the ROM 18 at the manufacture stage. However, for example, program signals are received from the network by using the LAN 38, so that a program can be installed in the NVRAM 22. In addition, the installation of the program may be performed through a storage medium in such a manner that a CD (Compact Disk) is read by a CD drive connected to the USB Port 42.

In the above, although the hardware structure of the image-processing apparatus 10 has been described, this structure is almost the same as that of a general computer. Differently from the image-processing apparatus 10, the general computer is not often provided with the hardware structural elements specialized for the image processing, such as the image-processing section 26, the Device IF 46, the reader section 48, and the printer section 49; however, similar to the image-processing apparatus 10, it includes a program-controlled CPU 16 and the like. An authentication agent, an authentication server, a document server, and the like exemplified in this exemplary embodiment can be configured by program-controlling the general computer.

Incidentally, the respective structural elements of the hardware are not necessarily required to be integrated, but may be divided into multiple communicable portions. In addition, these portions are distributed on the network and may constitute a distributed processing system.

Figure 2:
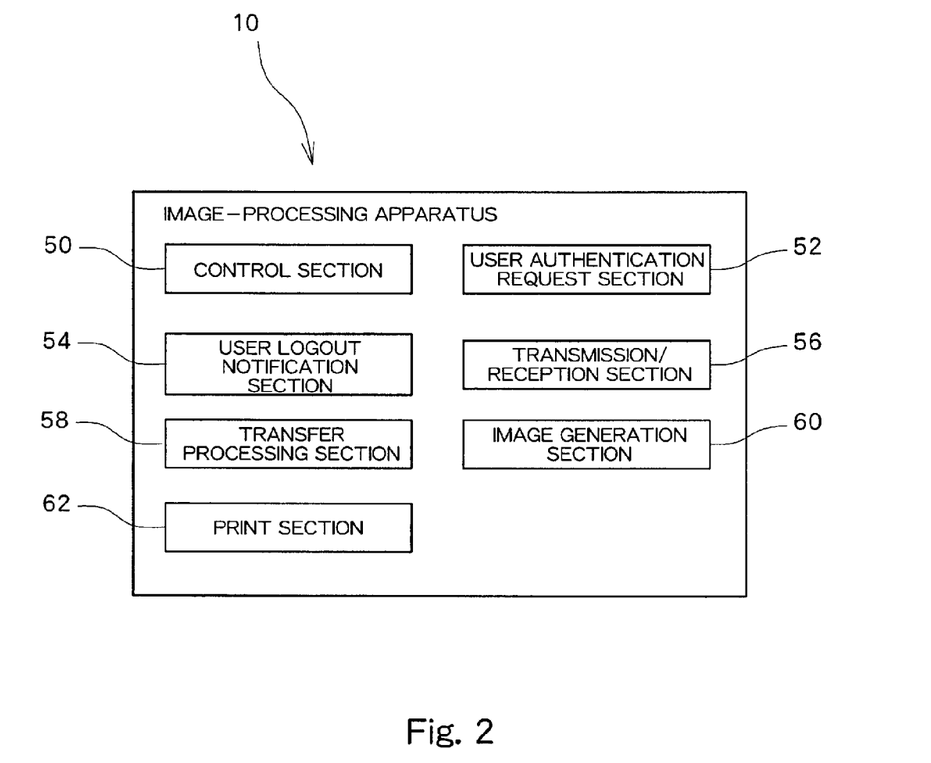
FIG. 2 is a view showing a functional structure example of the image-processing apparatus according to the exemplary embodiment.

Next, the functional structure of the image-processing apparatus 10 will be described. FIG. 2 is a schematic block diagram showing a functional structure example of the image-processing apparatus 10 shown in FIG. 1. The image-processing apparatus 10 includes, as main functional elements, a control section 50, a user authentication request section 52, a user logout notification section 54, a transmission/reception section 56, a transfer processing section 58, an image generation section 60, and a print section 62.

The control section 50 controls the respective functional elements. In the case where the user tries to log in (log on) to the image-processing apparatus 10, the user authentication request section 52 requests an authentication from the authentication server through the authentication agent. In the case where the user logs out (logs off) or in the case where a job relating to the instruction of the user is completed, the user logout notification section 54 notifies the authentication agent to this effect. The transmission/reception section 56 transmits/receives data to/from the document server or the authentication agent through the communication IF 36. The transfer processing section 58 controls the transmission/reception section 56, and performs transfer processing to transmit the received data directly to a transfer destination. The image generation section 60 is constructed from the reader section 48, and reads a sheet to generate image data. The print section 62 is constructed from the printer section 49, and performs printing on a sheet on the basis of the image data.

Figure 3:
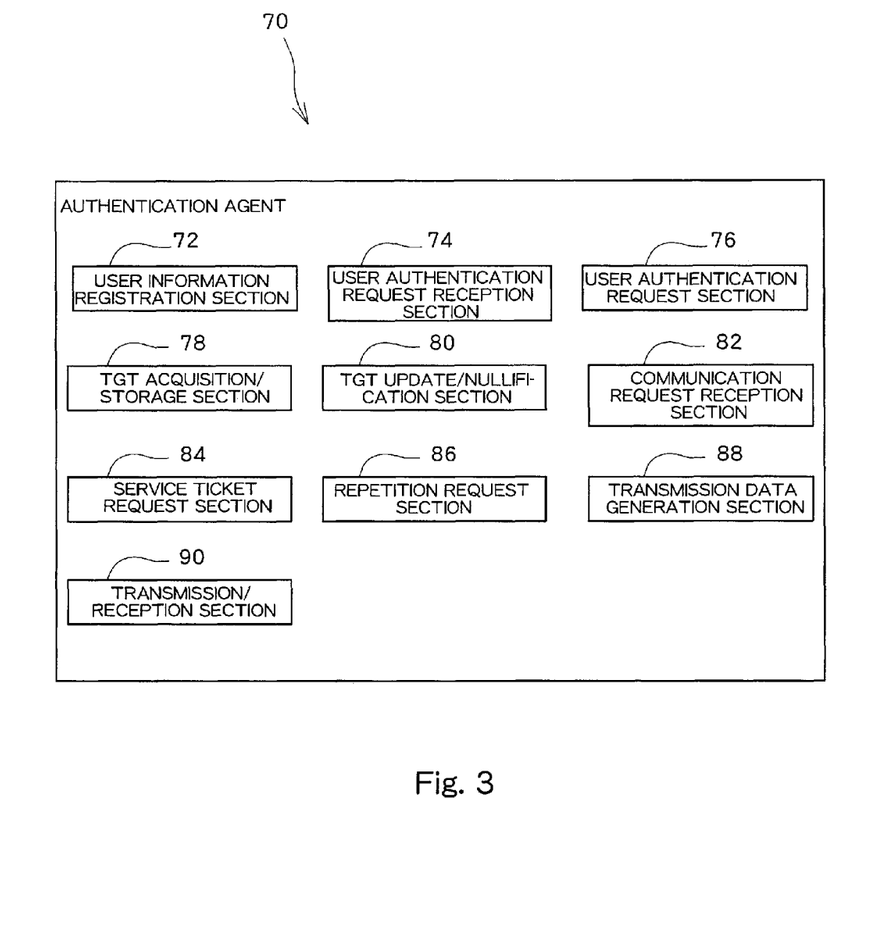
FIG. 3 is a view showing a functional structure example of an authentication agent according to the exemplary embodiment.

FIG. 3 is a schematic block diagram showing a functional structure example of an authentication agent 70. The authentication agent 70 includes a user information registration section 72, a user authentication request reception section 74, a user authentication request section 76, a TGT acquisition/storage section 78, a TGT update/nullification section 80, a communication request reception section 82, a service ticket request section 84, a repetition request section 86, a transmission data generation section 88, and a transmission/reception section 90.

In the user information registration section 72, registration of authentication information required for authentication of the user is performed. As the authentication information, there are named a user ID, a password, and the like. Although the user serving as a registration object is typically a user registered on the authentication server, the user is not necessarily registered on the authentication server. In the latter case, the attribute information of the user may include information to indicate whether an authentication request to the authentication server or a communication request through the network is permitted or inhibited. The registration may be performed beforehand, or in the case where the user authentication request reception section 74 receives the authentication request together with authentication information, the registration may be performed using this authentication information. The registered authentication information is used for requesting the authentication of the user from the authentication server, or used for requesting the authentication server to issue a service ticket to access an apparatus on the network.

The user authentication request reception section 74 is an example of a communication request reception unit, and receives the user authentication request from the client such as the image-processing apparatus 10. There is also a case where a user ID, a password, and the like, together with the authentication request, are received. Incidentally, although the request for the user authentication may be performed explicitly, it may be performed implicitly.

The user authentication request section 76 is an example of an authentication request unit, and requests the user authentication from the authentication server in accordance with the reception result of the user authentication request reception section 74. At the request of the user authentication, the authentication information received from the client, or the authentication information stored in the user information registration section 72 is also transmitted.

In response to the authentication request by the user authentication request section 76, the TGT acquisition/storage section 78 acquires from the authentication server a TGT (hereinafter also called an initial ticket) as authorization data and a session key, and stores them. The TGT is data to give the authorization to acquire the service ticket. In general, a suitable expiration date is set for the TGT.

The TGT update/nullification section 80 performs update of the TGT or nullification (discard, nullification request to the authentication server) in accordance with the work state of the user in the client. For example, in the case where it is notified from the image-processing apparatus 10 serving as the client that the user logs out (logout may be based on a timer), or the job left by the user is completed after the logout, the TGT update/nullification section 80 confirms the completion of the job processing on the user in the authentication agent 70, and performs the nullification of the TGT. Meanwhile, the TGT update/nullification section 80 continues to hold the TGT during the login of the user or during the period when the job of the user remains, and requests the authentication server to update the ticket before the expiration date of the TGT.

The communication request reception section 82 is an example of a communication request reception unit. The communication request reception section 82 receives from the client a request for communication (one or both of reception and transmission) with another apparatus on the network. The request may be performed explicitly or implicitly.

The service ticket request section 84 is an example of an enabling data acquisition unit. On the basis of the reception result of the communication request reception section 82, the service ticket request section 84 issues a request to the authentication server for a communication permission request with respect to an apparatus serving as a communication partner, and specifically, requests the authentication server to issue the service ticket for communication with the apparatus serving as the communication partner. The request is performed by use of the TGT. Of course, when the authentication server permits, without using the TGT, it is possible to request the service ticket by again using the authentication information used for the user authentication. A session key serving as a common key for communication used between the communication partner and the authentication agent 70 is embedded in the service ticket, and the service ticket is encrypted with a common key held by only the communication partner (and the authentication server). Accordingly, in the case where the decryption is successful, the communication partner having acquired the service ticket determines that the authentication agent 70 is permitted to communicate. Then, the extracted session key is used, and the encrypted safe communication can be performed with the authentication agent 70. As stated above, the service ticket is the enabling data to enable the communication with the apparatus serving as the communication partner.

The repetition request section 86 again tries communication when communication with the apparatus serving as the communication partner has failed. In this case, in order to once terminate the processing of the client, for example, a status that the processing is transferred from the client to the authentication agent 70 may be notified to the client. Incidentally, in the case where communication cannot be enabled even if the setting number of times or setting time is exceeded, the repetition processing is stopped, and a notification that the processing is failed is given to the client.

The transmission data generation section 88 is an example of a generation unit, and generates transmission data for delivering the service ticket (common key for communication) to the apparatus serving as the communication partner and transmission data obtained by encrypting data of a communication object with the common key for communication. Incidentally, the protocol of the transmission data is not particularly limited, and has only to be determined in accordance with the setting or in accordance with the instruction from the client. As examples of the protocol, there are named an SMB (Server Message Block), an FTP (File Transfer Protocol), an IPP (Internet Printing Protocol), and the like.

The transmission/reception section 90 is an example of a data reception unit, a data re-reception unit, a transmission unit, or the like, and performs transmission/reception of data. As a partner of the transmission/reception, there is named a communication destination requested by the client, in addition to the client and the authentication server.

Next, the system structure of this exemplary embodiment will be described by reference to FIG. 4 to FIG. 8.

Figure 4:
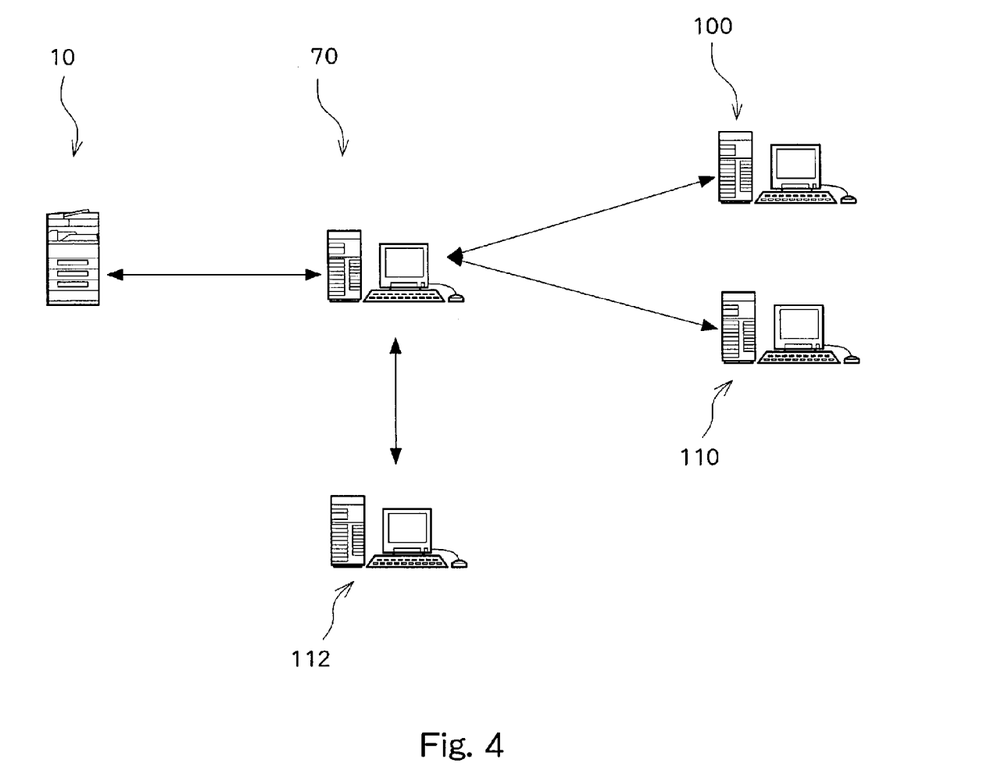
FIG. 4 is a view showing a structure in a first system mode.

[First system mode] FIG. 4 is a view for explaining a structure of a first system mode. This system includes an image-processing apparatus 10, an authentication agent 70, an authentication server 100, a document server 110, and a temporary storage server 112.

The authentication server 100 is an apparatus which serves as an authentication server, a key distribution center, and a ticket delivery server in the Kerberos authentication technique. The authentication server 100 may configure a single authentication system, or may be configured by mutual authentication (cross-realm authentication) of multiple authentication systems.

The image-processing apparatus 10 is a client of the authentication server 100, and is the apparatus having the hardware structure shown in FIG. 1 and the functional structure shown in FIG. 2. Here, the client is an apparatus to enjoy an authentication service provided by the authentication server 100. The image-processing apparatus 10 indirectly requests the service from the authentication server 100 through the authentication agent 70 and enjoys the service.

The authentication agent 70 is the apparatus having the functional structure shown in FIG. 3, and is disposed between the image-processing apparatus 10 and the authentication server 100. The authentication agent requests the service from the authentication server 100 on the basis of the request from the image-processing apparatus 10, and returns to the image-processing apparatus 10 the service provided by the authentication server 100.

The document server 110 is the server to perform storage of document data, and the like. The document server 110 is a client of the authentication server 100, and enjoys the authentication service of the authentication server 100. The same common key as used by the authentication server 100 is held in the document server 110.

The temporary storage server 112 is an example of an external apparatus, and is the server to store document data similarly to the document server 110. The temporary storage server 112 can store a large volume of data as compared with the authentication agent 70. The temporary storage server 112 may be or may not be the client of the authentication server 100. However, it is assumed that the temporal storage server 112 can safely communicate under the authentication agent 70 and the authentication server 100 or under another authentication system or suitable communication safety setting.

On the communication path between the image-processing apparatus 10 and the authentication agent 70, communication safety (communication security) is secured on the basis of settings different from those of the authentication system provided by the authentication server. The securement of the communication safety is performed by, for example, direct connection of a cable or a public key authentication system. Meanwhile, the communication safety among the image-processing apparatus 10, the authentication server 100, and the document server 110 is secured on the basis of the system provided by the authentication server 100.

Figure 5:
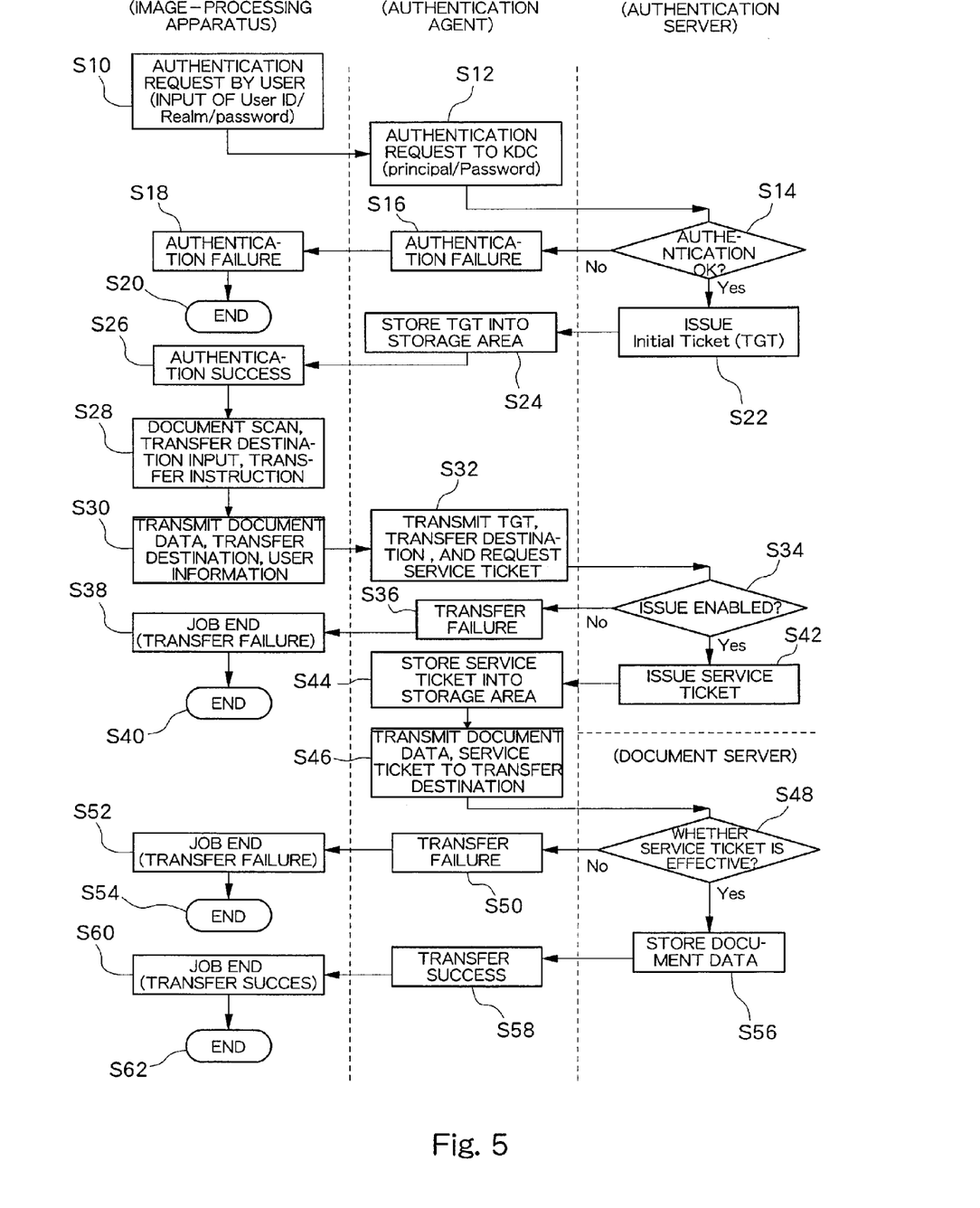
FIG. 5 is a flowchart showing a flow of processing in the first system mode.

Next, a flow of processing in which document data scanned by the image processing apparatus 10 are stored in the document server 110 will be described by reference to a flowchart of FIG. 5.

When the user inputs authentication information such as a user ID, a realm (represents a range on the network; A domain name is typically given) and a password, the image-processing apparatus 10 transmits the authentication information to the authentication agent 70 and issues a request for external authentication (S10). The authentication agent 70 converts the authentication information into a principal (information to clarify the identify of the processing object; typically generated by combining the user ID and the realm) and the password in accordance with the system of the authentication server 100, and requests the authentication from the authentication server 100 (S12). The authentication server 100 performs the user authentication on the basis of the previously registered password (S14). As a result, when the authentication has failed, that is informed to the authentication agent 70 (S16), and further is transmitted from the authentication agent 70 to the image-processing apparatus 10 (S18), and the processing is ended (S20). On the other hand, in the case where the authentication is successful, the TGT serving as authorization data is issued (S22) and is transmitted to the authentication agent 70. The authentication agent 70 stores this TGT into a storage area (S24), and notifies the image-processing apparatus 10 that the authentication is successful (S26).

Here, in the image-processing apparatus 10, the user who succeeded in the login performs scanning of a document, as well as input of a transfer destination of document data generated by this, and transfer instructions (S28). The image-processing apparatus 10 transmits the document data, the transfer destination, and the user information of the login user to the authentication agent 70, and makes a transfer request (S30). The user information is the information to indicate that the user is the same as the previously authenticated user. As an example of the user information, there is a combination of the user ID and the realm.

The authentication agent 70 transmits the TGT and the transfer destination to the authentication server 100, and requests access permission to the transfer destination; that is, requests the issuance of a service ticket to enable the access to the transfer destination (S32). The authentication server 100 verifies the TGT (S34), and in the case where the verification has failed, that is notified to the authentication agent 70. In the authentication agent 70, the transfer has failed (S36), and that is notified to the image-processing apparatus 10. As a result, in the image-processing apparatus 10, the job on the document transfer remains failed and is ended (S38, S40). On the other hand, in the case where the verification of the TGT is successful, the service ticket is issued (S42) and is transmitted to the authentication agent 70. The service ticket is encrypted with a key owned by the document server 110. The authentication agent 70 stores the service ticket into the storage area (S44). Further, the authentication agent 70 uses the document data and the service ticket to generate transmission data, and transmits the data to the transfer destination (S46). The generation of the transfer data is performed by, for example, attaching the service ticket or by encrypting the document data, so that the document data is accepted by the transfer destination.

When receiving the transmission data, the document server 110 serving as the transfer destination decrypts the service ticket included in the transmission data, and verifies the effectiveness; that is, whether the transmission data are transmitted from the partner who is permitted to perform communication by the authentication server 100 (S48). In the case where the verification has failed, this is notified to the authentication agent 70. As a result, in the authentication agent 70, the transfer has failed (S50), and the image-processing apparatus 10 remains failed in the transfer and ends the job (S52, S54). On the other hand, in the case where it is determined that the service ticket is effective, the document server 110 extracts the document data from the transmission data and stores the data (S56). The authentication agent 70 receives the report that the transfer is successful (S58), and the image-processing apparatus 10 ends the job successfully (S60, S62).

In the series of processings, it is conceivable that the document data are transmitted from the image-processing apparatus 10 to the authentication agent 70 before the authentication agent 70 acquires the service ticket. In such a case, the authentication agent 70 temporarily stores the received document data into the temporary storage server 112. After issuance of the service ticket, the document data are again acquired from the temporary storage server 112.

In addition, in the series of processings, it is conceivable that although the authentication agent 70 acquires the service ticket, the document server 110 is not in the reception enabling state. However, also in this case, the authentication agent 70 temporarily stores the received document data into the temporary storage server 112, and after the document server 110 is brought into the reception enabling state, the document data may be again acquired from the temporary storage server 112.

Incidentally, in general, the expiration date is set for the TGT. The authentication agent 70 monitors the expiration date, and can update the TFT before the expiration date. In addition, in the case where the user logs out from the image-processing apparatus 10, or in the case where the user logs out and all jobs of the user are ended, the image-processing apparatus 10 notifies the authentication agent 70 to that effect. The authentication agent 70 confirms that there is no assigned job execution with respect to this user, and discards the TGT of the user.

Figure 6:
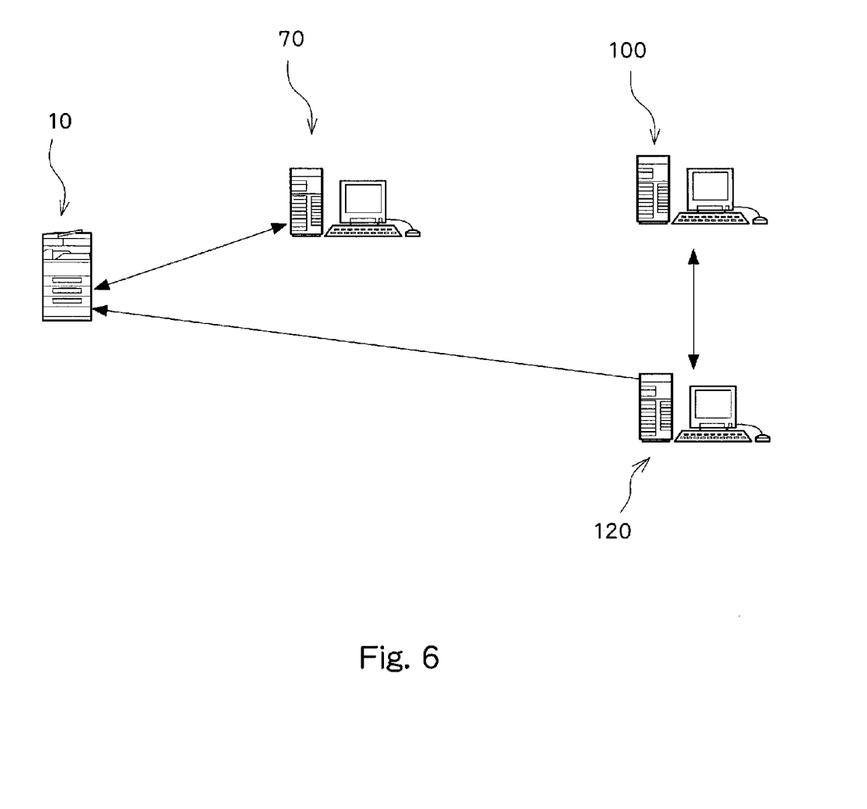
FIG. 6 is a view showing a structure in a second system mode.

[Second system mode] FIG. 6 is a view for explaining a structure of a second system mode. This system includes an image-processing apparatus 10, an authentication agent 70, an authentication server 100, and a PC (Personal Computer) 120. The image-processing apparatus 10, the authentication agent 70, and the authentication server 100 are apparatuses similar to those of the first system mode. That is, the image-processing apparatus 10 is the client of the authentication server 100, and the authentication agent 70 is the apparatus to carry out at least a part of the authentication processing on behalf of the image-processing apparatus 10. The safety of communication between the image-processing apparatus 10 and the authentication agent 70 is ensured by a unique system. The PC 120 is the client of the authentication server 100.

Figure 7:
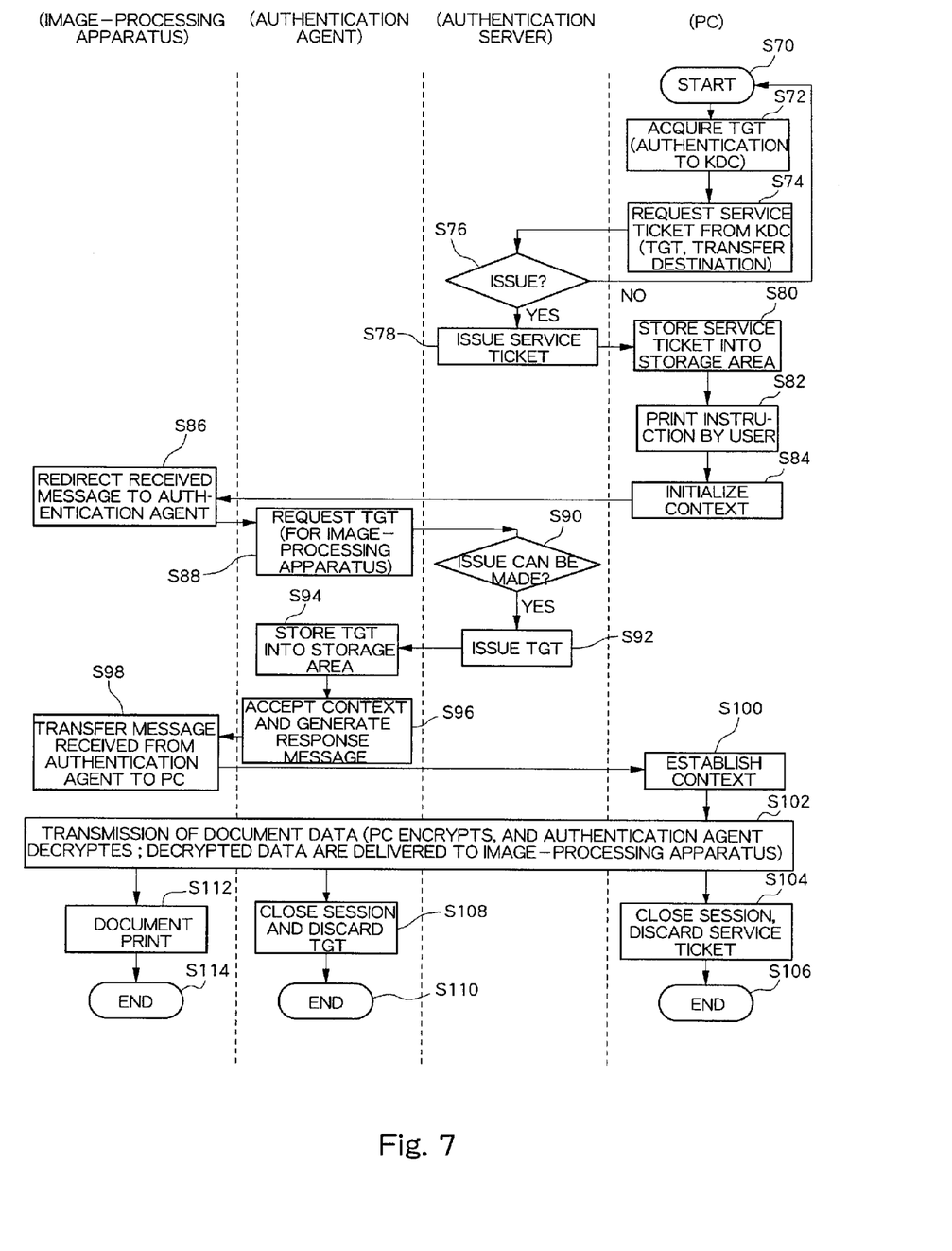
FIG. 7 is a flowchart showing a flow of processing in the second system mode.

Next, a flow of processing of a case where printing of document data is requested to the image-processing apparatus 10 from the PC 120 will be described by reference to a flowchart of FIG. 7. The PC 120 first transmits authentication information to the authentication server (KDC) 100 to obtain user authentication, and acquires the TGT (S72). Next, the PC 120 transmits the TGT and the information of the transfer destination to the authentication server 100, and requests the service ticket for accessing the image-processing apparatus 10 (S74). The authentication server 100 verifies the TGT and determines whether or not the service ticket can be issued (S76), and in the case where the issuance cannot be made, the authentication servers notifies the PC 120 to that effect, and in the case where the issuance can be made, the service ticket is issued and is transmitted to the PC 120 (S78). The PC 120 stores the acquired service ticket into a storage area (S80). In the case where the PC 120 has already acquired the TGT or the service ticket, it is unnecessary to repeat these steps.

Next, in the PC 120, the user instructs printing of document data (S82). In response to this, the PC 120 initializes the context for communication (S84), and transmits to the image-processing apparatus 10 a message including the service ticket. This message is redirected to the authentication agent 70 by the image-processing apparatus 10 (S86).

In the case where the image-processing apparatus 10 has not been authenticated, the authentication agent 70 transmits the principle name and the password of the image-processing apparatus 10 to the authentication server 100, and the processing to request the issuance of the TGT is performed (S88). The authentication server 100 verifies the TGT (S90), and in the case where the issuance can be made, the TGT (initial ticket) is issued and is transmitted to the authentication agent 70 (S92).

The authentication agent 70 stores the TGT into the storage area (S94). The service ticket transmitted from the PC 120 is decrypted with a common key shared with the image-processing apparatus 10, and time verification processing or the like is performed. In the case where it is determined that the access is proper, the authentication agent 70 accepts the context, and generates a response message on protocol information and the like to be notified to the PC 120 (S96). The image-processing apparatus 10 transmits the received response message to the PC 120 (S98), and by this, the context is established in the image-processing apparatus 10 (S100).

The PC 120 encrypts the document data as the print object and print instruction data with the key for communication, and transmits them to the image-processing apparatus 10. The image-processing apparatus 10 redirects them to the authentication agent 70. The authentication agent 70 decrypts the document data and the print instruction data, and delivers them to the image-processing apparatus 10 (S102). This process is repeated until the image-processing apparatus 10 obtains all data.

Finally, the PC 120 closes the session, discards the service ticket (S104), and ends the processing (S106). The authentication agent 70 closes the session, discards the TGT (S108), and ends the processing (S110). The image-processing apparatus 10 prints the document data on the basis of the print instruction data (S112), and ends the processing (S114).

Figure 8:
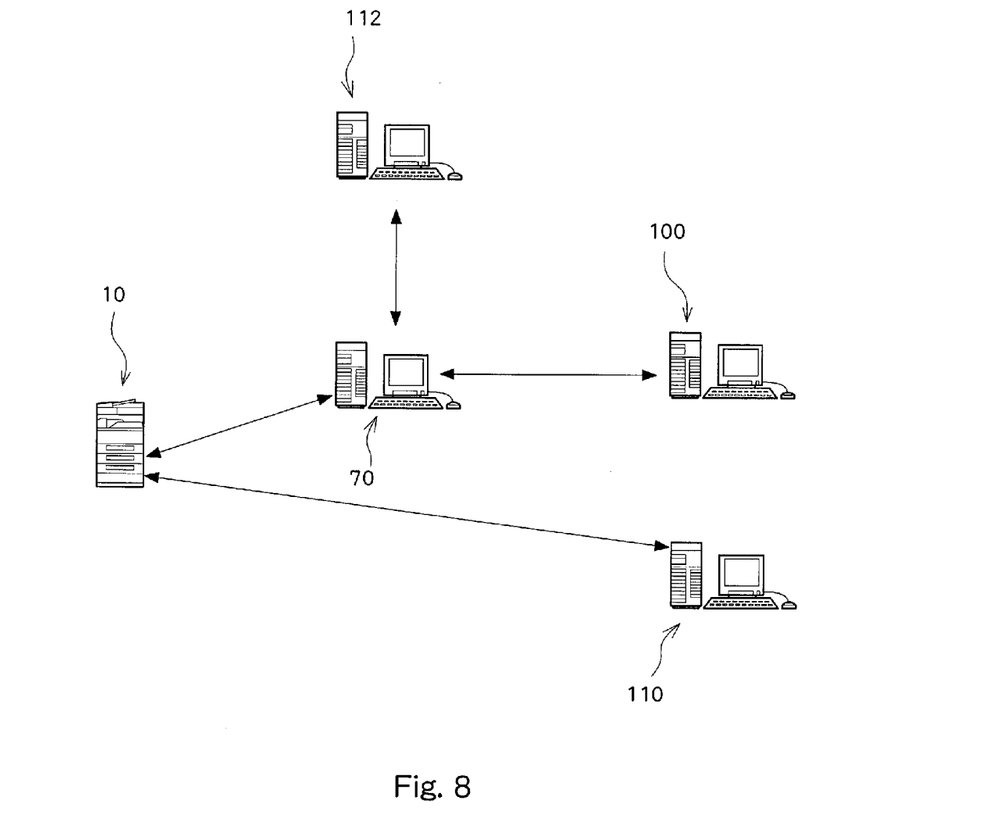
FIG. 8 is a view showing a structure in a third system mode.

[Third system mode] FIG. 8 is a view for explaining a structure of a third system mode. Similar to the first system mode, this system includes an image-processing apparatus 10, an authentication agent 70, an authentication server 100, a document server 110, and a temporary storage server 112.

Here, a processing to transmit document data from the image-processing apparatus 10 to the document server 110 will be described. In the processing, first, in the image-processing apparatus 10, the user inputs authentication information. The image-processing apparatus 10 transmits the authentication information to the authentication agent 70 to request authentication, and the authentication agent 70 transmits the authentication information to the external authentication server 100 to request user authentication. In the case where the authentication is successful, the TGT is issued in the authentication server 100, is transmitted to the authentication agent 70, and is stored.

The user of the image-processing apparatus 10 generates document data by reading a document, and issues an instruction to transmit the document data to the document server 110. In this case, the image-processing apparatus 10 redirects and transmits the document data and the protocol information to the authentication agent in accordance with the setting. The authentication agent 70 generates transmission data to transmit the document data to the document server 110 and gives the notification to the device on the basis of the protocol information.

In this process, when the service ticket is necessary, the authentication agent 70 uses the TGT and requests the authentication server 100 to issue the service ticket. The authentication server 100 issues the service ticket encrypted with a common key of the document server 110. In addition, the authentication agent 70 uses a key generated for communication with the document server 110, and encrypts the electronic document.

In this way, the generated transmission data are transmitted to the image-processing apparatus 10, and are further transferred to the document server 110 by the image-processing apparatus 10. Incidentally, the authentication agent 70 uses the same path to perform negotiation with the document server 110 and the decryption of the transmission data from the document server 110. That is, in this system mode, in the case where the image-processing apparatus 10 communicates with the document server 110 under the authentication server 100, all transmission/reception data (or data requiring authentication, encryption, decryption and the like) are redirected and transmitted to the authentication agent 70, and the processing of authentication, encryption, decryption, and the like is performed. Incidentally, the role of the temporary storage server 112 is similar to that of the first system mode. That is, during the period of waiting for the authentication processing of the authentication agent, the data to be held in the authentication agent 70 are temporarily stored in the temporal storage server 112.

In the above description, although the description has been made on the mode in which only one client of the communication uses the authentication agent, it may be the case that both clients use the authentication agent. In the case where the two clients use different authentication agents, each of the authentication agents has only to perform the processing as described above. However, in the case where both clients use the same authentication agent, the encryption and decryption are performed by the same authentication agent. That is, it becomes unnecessary to perform the encryption and decryption, and therefore, it becomes unnecessary to request the authentication server to issue the service ticket. Accordingly, in the case where clients using the same authentication agent communicate with each other, the authentication agent can permit the communication between both without receiving the permission of the authentication server.

In addition, although the description is made on the basis of the authentication technique of Kerberos using the common key, this exemplary embodiment can be applied also to another authentication system. For example, it is conceivable to introduce a public key encryption system to a part or all of the processing using the common key in the authentication technique of Kerberos.

The foregoing description of the exemplary embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with various modifications as are suited to the particular use contemplated. It is intended that the scope of the invention be defined by the following claims and their equivalents.

What is claimed is:

1. An authentication agent apparatus comprising:
   a communication request reception unit that receives a request, from client A of an authentication server, to communicate with client B of the authentication server;
   a data reception unit that receives, from client A, document data to be transmitted to client B;
   an authentication request unit that issues, to the authentication server, an authentication request to authenticate client A;
   a communication enabling request unit that requests the authentication server to enable communication between client A and client B;
   an enabling data acquisition unit that acquires enabling data, from the authentication server, to enable the communication between client A and client B;
   a generation unit that generates transmission data to be transmitted to client B on the basis of the acquired enabling data and the received document data which is received from client A;
   an authorization data acquisition unit that acquires, as a result of the authentication request, authorization data, from the authentication server, to give authorization to permit enabling of communication between a different client of the authentication server and client A; and
   a holding unit that holds the authorization data, wherein the communication enabling request unit requests the enabling of the communication on the basis of the authorization data.

2. The authentication agent apparatus according to claim 1, further comprising a transmission unit that transmits the transmission data to client B.

3. The authentication agent apparatus according to claim 1, further comprising a transmission unit that transmits the transmission data to client A.

4. The authentication agent apparatus according to claim 1, wherein the authentication agent apparatus is set to be capable of communicating with an external apparatus to which a reliable relation has been previously established, and said holding unit transmits the data to be transmitted to the external apparatus and causes the data to be held in a case where the data reception unit receives the document data to be transmitted before the enabling data acquisition unit acquires the enabling data, and the authentication agent apparatus further comprises:
   a data re-reception section that re-receives the document data to be transmitted from the external apparatus after the enabling data acquisition unit acquires the enabling data.

5. The authentication agent apparatus according to claim 1, wherein client A is an apparatus to perform a processing under use authorization of a user, and the authentication agent apparatus performs a processing on the communication with client B under the use authorization of the user.

6. An authentication agent method comprising:
   receiving, from client A, document data to be transmitted to client B;
   issuing, to the authentication server, an authentication request to authenticate client A;
   requesting the authentication server to enable communication between client A and client B;
   acquiring enabling data, from the authentication server, to enable the communication between client A and client B;
   generating transmission data to be transmitted to client B on the basis of the acquired enabling data and the received document data which is received from client A;
   acquiring, as a result of the authentication request, authorization data, from the authentication server, to give authorization to permit enabling of communication between a different client of the authentication server and client A; and
   holding the authorization data, wherein, in the communication enabling request, the enabling of the communication is requested on the basis of the authorization data.

7. The authentication agent method according to claim 6, further comprising:
   transmitting the transmission data to client B.

8. The authentication agent method according to claim 6, further comprising:
   transmitting the transmission data to client A.

9. The authentication agent method according to claim 6, further comprising: setting the authentication agent to be capable of communicating with an external apparatus to which a reliable relation has been previously established; transmitting the document data to be transmitted to the external apparatus and causing the data to be held in a case where the document data to be transmitted are received before the enabling data are acquired; and re-receiving the document data to be transmitted from the external apparatus after the enabling data are acquired.

10. The authentication agent method according to claim 6, wherein client A is an apparatus to perform a processing under use authorization of a user, and the method further comprises:
performing a processing on the communication with client B under the use authorization of the user.

11. A non-transitory computer-readable medium storing a program causing a computer to execute a process for authentication agent, the process comprising:
receiving a request, from client A of an authentication server, to communicate with client B of the authentication server;
receiving, from client A, data to be transmitted to client B;
issuing, to the authentication server, an authentication request to authenticate client A;
requesting the authentication server to enable communication between client A and client B;
acquiring enabling data, from the authentication server, to enable the communication between client A and client B;
generating transmission data to be transmitted to client B on the basis of the acquired enabling data and the received document data which is received from client A;
acquiring, as a result of the authentication request, authorization data, from the authentication server, to give authorization to permit enabling of communication between a different client of the authentication server and client A; and
holding the authorization data, wherein, in the communication enabling request, the enabling of the communication is requested on the basis of the authorization data.

12. The non-transitory computer-readable medium according to claim 11, wherein the process further comprises:
transmitting the transmission data to client B.

13. The non-transitory computer-readable medium according to claim 11, wherein the process further comprises:
transmitting the transmission data to client A.

14. The non-transitory computer-readable medium according to claim 11, wherein the computer is set to be capable of communicating with an external apparatus to which a reliable relation has been previously established, and the process further comprises:
transmitting the document data to be transmitted to the external apparatus and causing the data to be held in a case where the document data to be transmitted are received before the enabling data are acquired; and
re-receiving the document data to be transmitted from the external apparatus after the enabling data are acquired.

15. The non-transitory computer-readable medium according to claim 11, wherein client A is an apparatus to perform a processing under use authorization of a user, and the process further comprises:
performing a processing on the communication with client B under the use authorization of the user.

16. The authentication agent apparatus according to claim 1, further comprising a ticket granting ticket holding unit to hold a ticket granting ticket;
said ticket granting ticket holding unit updating the ticket granting ticket in accordance with a login status of client A.

17. The authentication agent apparatus according to claim 1, further comprising a ticket granting ticket holding unit to hold a ticket granting ticket;
said ticket granting ticket holding unit updating the ticket granting ticket in accordance with a job status of jobs associated with client A.

18. The authentication agent apparatus according to claim 1, wherein the authentication agent apparatus notifies client A when the authentication agent tries to re-establish communication with client B.

19. The authentication agent method according to claim 6, further comprising:
holding a ticket granting ticket; and
updating the ticket granting ticket in accordance with a login status of client A.

20. The authentication agent method according to claim 6, further comprising:
holding a ticket granting ticket; and
updating the ticket granting ticket in accordance with a job status of jobs associated with client A.

21. The authentication agent method according to claim 6, further comprising:
notifying client A when the authentication agent tries to re-establish communication with client B.

22. The non-transitory computer-readable medium according to claim 11, wherein the process further comprises:
holding a ticket granting ticket; and
updating the ticket granting ticket in accordance with a login status of client A.

23. The non-transitory computer-readable medium according to claim 11, wherein the process further comprises:
holding a ticket granting ticket; and
updating the ticket granting ticket in accordance with a job status of jobs associated with client A.

24. The non-transitory computer-readable medium according to claim 11, wherein the process further comprises:
notifying client A when the authentication agent tries to re-establish communication with client B.

* * * * *